United States Patent [19]
Jeffries

[11] Patent Number: 6,009,479
[45] Date of Patent: Dec. 28, 1999

[54] SYSTEM AND METHOD FOR ASSIGNING UNIQUE ADDRESSES TO AGENTS ON A SYSTEM MANAGEMENT BUS

[75] Inventor: Kenneth Layton Jeffries, Leander, Tex.

[73] Assignee: Dell USA, L.P., Round Rock, Tex.

[21] Appl. No.: 08/866,678

[22] Filed: May 30, 1997

Related U.S. Application Data

[63] Continuation-in-part of application No. 08/389,849, Feb. 17, 1995, Pat. No. 5,636,342.

[51] Int. Cl.$^6$ .............................. G06F 11/00; G06F 3/00
[52] U.S. Cl. ................................... 710/8; 710/62
[58] Field of Search ................... 395/828, 829, 395/830, 831, 832, 833, 874, 882; 710/8–14, 62

[56] References Cited

U.S. PATENT DOCUMENTS

| | | |
|---|---|---|
| 4,679,192 | 7/1987 | Vanbrabant . |
| 4,701,878 | 10/1987 | Günkel et al. . |
| 4,727,475 | 2/1988 | Kiremidjian . |
| 4,773,005 | 9/1988 | Sullivan . |
| 5,148,389 | 9/1992 | Hughes . |
| 5,175,822 | 12/1992 | Dixon et al. . |
| 5,204,669 | 4/1993 | Dorfe et al. . |
| 5,317,693 | 5/1994 | Cuenod et al. . |
| 5,379,437 | 1/1995 | Celi, Jr. et al. . |
| 5,404,460 | 4/1995 | Thomsen et al. . |
| 5,483,518 | 1/1996 | Whetsel . |
| 5,499,374 | 3/1996 | Di Giulio et al. . |
| 5,524,269 | 6/1996 | Hamilton et al. . |
| 5,708,831 | 1/1998 | Schön ........................... 395/829 |

*Primary Examiner*—Ayaz R. Sheikh
*Assistant Examiner*—David A. Wiley
*Attorney, Agent, or Firm*—Skjerven, Morrill, MacPherson, Franklin & Friel LLP; Ken J. Koestner

[57] ABSTRACT

A computer system including a bus master performs a method for automatically assigning addresses to agents on a bus. Addresses are automatically assigned so that a computer system user does not set physical or logical switches, either manually or through software programming. The system and method also automatically assign unique addresses to new devices that are inserted on the bus while the bus is operating, thereby supporting "hot pluggable" devices. Slave agents are originally configured to operate at a class address. At the beginning of the method, a master determines whether any of the slaves reside at the class address. If so, then the master determines a new unique address and issues a Get Bitwise UID command to the slaves residing at the class address. Each of the slaves receives the Get Bitwise UID and responsively transmits a hardware identification (UID) in a loop of bitwise byte transmissions. One slave successfully transmits the hardware identification (UID) while the other individual slaves detect transmission errors during transmission of the hardware identification (UID) and terminate transmission upon the error detection. The unsuccessful slaves, if previously residing at a unique address, revert to the class address. The master receives the hardware identification (UID) of the successfully transmitting slave and issues a Set Address command in combination with the hardware identification (UID) and the new unique address to all slave agents at the class address. Only the slave agent with a hardware identification (UID) matching the UID of the Set Address command processes the Set Address command to completion and is assigned the address. The master uses the Get Bitwise UID command followed by the Set Address command in a loop to locate, identify and assign addresses to agents responding to a predetermined class address.

31 Claims, 6 Drawing Sheets

SYSTEM AND METHOD FOR ASSIGNING UNIQUE ADDRESSES TO AGENTS ON A SYSTEM MANAGEMENT BUS

This application is a continuation-in-part of copending patent application Ser. No. 08/389,849, filed on Feb. 17, 1995, and entitled "System And Method For Assigning Unique Addresses To Agents On A System Management Bus", by Kenneth L. Jeffries, now U.S. Pat. No. 5,636,342 and which is incorporated herein by reference in its entirety.

BACKGROUND OF THE INVENTION

1. Field of the Invention

The present invention relates to computer systems which include a bus. More particularly, the present invention relates to a system and method for automatically assigning unique addresses to agents on a bus in a computer system.

2. Description of the Related Art

Computer systems generally include multiple devices interconnected by one or more various buses. For example, a typical computer system architecture includes a CPU connected to main memory through a host or memory bus. The host or memory bus is connected to an expansion bus. In modem computer architectures, the expansion bus is typically a local bus such as a peripheral component interconnect (PCI) bus. The local bus may then be connected to a more traditional expansion bus such as an AT bus or Industry Standard Architecture (ISA) bus, an Extended ISA (EISA) bus or a microchannel architecture (MCA) bus.

A computer system often includes a bus referred to as a system management bus used for monitoring operations within the system without involvement of the host processor and/or without requiring host processor operability. The system management bus operates in the background and does not use CPU resources. Thus the system management bus operates independently of an operating system that controls the computer system. Therefore, the system management bus operates in parallel with and independently of other operations that are occurring on other buses within the computer system.

A system management bus is typically used to connect devices called "agents". Agents monitor operations of other devices in the system and made data accessible for display to a computer user. Examples of devices which can be connected to a system management bus include monitoring cards for monitoring disk drive functions, control panel consoles for displaying the status of the disk drives within a system, and power supply monitors for monitoring and reporting the status of the power supply in the system, and the like.

Devices connected to a system management bus generally perform control functions so the bus specification does not include high speed data transfer capabilities. Therefore a system management bus is typically implemented using a serial bus protocol. One popular serial bus protocol is an $I^2C$ serial bus standard protocol developed by Phillips Corporation. In one implementation, the system management bus is implemented at the electrical level and the lowest protocol level using the $I^2C$ serial bus protocol. An additional protocol may then be run "on top" of the $I^2C$ bus to facilitate data transfers between the devices.

Each agent connected to a system management bus based on the $I^2C$ protocol is assigned a dedicated $I^2C$ address for proper operation of the bus. The conventional method for assigning addresses to agents on the bus involves a selection of hardwired interconnects, dip switches, or jumpers by a designer. The designer specifies dip switch or jumper connections and a computer system user either manually sets the dip switches or jumpers. Alternatively, the computer system user uses configuration software to operate logical switches. The manual setting of switches or manipulation of switches through software control is often tedious and error prone.

What is needed is a system and method for automatically assigning addresses to agents on a serial system management bus in a computer system without user intervention. What is also needed is a system and method for automatically assigning unique addresses to new "hot-pluggable" agents that are subsequently connected to the bus.

SUMMARY OF THE INVENTION

In accordance with one aspect of the present invention, a computer system including a bus master performs a method for automatically assigning addresses to agents on a bus. Addresses are automatically assigned so that a computer system user does not set physical or logical switches, either manually or through software programming. The system and method also automatically assign unique addresses to new devices that are inserted on the bus while the bus is operating, thereby supporting "hot pluggable" devices.

In an illustrative embodiment, the bus is a system management bus (SMB) operating according to an $I^2C$ serial protocol. The system management bus (SMB) includes one or more SMB masters and a plurality of SMB slaves. The SMB master and SMB slaves perform predetermined monitoring and control operations in the computer system. The SMB master performs a method for assigning unique addresses to each of the SMB slaves automatically and without user intervention. The disclosed method and system for automatic assignment of addresses advantageously simplifies, improves efficiency, and avoids error in assigning addresses to bus agents in comparison to conventional manual and software programming techniques.

In accordance with an embodiment of the present invention, the bus operates in compliance with a protocol that includes a plurality of commands. Two useful commands are a Set Address command and a Get Identifier command. A master sends the Get Identifier command to slave agents on the bus at a class address. The individual slave agents respond to the Get Identifier command by transmitting an identifier identifying the agent. When the master issues a Get Identifier command using the agent class address, the slave agents at the class address respond and exactly one slave agent successfully transmits an identifier. A transmission error occurs when the data on the bus is different from the data sent by a slave. The slave agents that do not successfully transmit the identifier detect a transmission error in the response, terminate transmission of the identifier response as a result of the error detection, and revert to the class address if a unique address was previously assigned.

The master sends the Set Address command accompanied by a unique address and an agent identifier to all agent slaves residing at the class address. All slave agents at the class address receive the Set Address command but only the agent with the matching agent identifier processes the Set Address command to completion and changes the bus address to the unique address.

In accordance with a more specific embodiment of the present invention, the bus is a system management bus (SMB) operating under a special protocol in conjunction with a standard $I^2C$ protocol. The $I^2C$ protocol supports several commands including a Set Address command and a Get Bitwise UID command that are useful for automatically assigning addresses to SMB agents. The SMB master issues a Get Bitwise UID command to evoke a responsive transmission from SMB agents residing on the SMB at the class address. The SMB agents respond to the Get Bitwise UID request by transmitting a hardware identifier (UID) associated with the agent. The SMB agent transmits the hardware identifier (UID) one bit at a time with each bit transmitted as a single byte. In an illustrative embodiment, the responsive byte is transmitted as either all one's (0×ff) or all zero's (0×00). The SMB agents check for transmission errors during the responsive transmission, terminate the responsive transmission upon detection of an error, and revert to the class address if a unique address was previously assigned.

The SMB master receives the hardware identifier (UID) from the SMB agent that successfully transmits the UID. The SMB master determines a unique agent address and assigns the unique agent address to the SMB agent that successfully transmitted the hardware identifier (UID) using the Set Address command. The master issues the Set Address command in combination with the unique agent address and the hardware identifier to all SMB agents. Only the SMB agent having a hardware identifier (US)) that matches the hardware identifier included in the Set Address command processes the Set Address command to completion, successfully changing the SMB address of the agent.

In accordance with another aspect of the present invention, the SMB slave agents are originally configured to operate at a class address. At the beginning of the method, the SMB master determines whether any of the SMB slaves reside at the class address. If so, then the SMB master determines a new unique address and issues a Get Bitwise UID command to the slaves residing at the class address. Each of the slaves receives the Get Bitwise UID and responsively transmits a hardware identification (UID) in a loop of bitwise byte transmissions. One slave successfully transmits the hardware identification (UID) while the other individual slaves detect transmission errors during transmission of the hardware identification (UID) and terminate transmission upon the error detection. The unsuccessful slaves, if previously residing at a unique address, revert to the class address. The SMB master receives the hardware identification (UID) of the successfully transmitting slave and issues a Set Address command in combination with the hardware identification (UID) and the new unique address to all slave agents at the class address. Only the slave agent with a hardware identification (UID) matching the UID of the Set Address command processes the Set Address command to completion and is assigned the SMB address.

The master uses the Get Bitwise UID command followed by the Set Address command in a loop to locate, identify and assign SMB addresses to agents responding to a predetermined class address. The operating loop is advantageously executed exactly once for each of the slave agents connected to the bus, avoiding unnecessary instruction cycles, latency, and expenditure of energy.

In accordance with an embodiment of the present invention, an apparatus includes a communications medium, a master device connected to the communications medium and a slave device connected to the communications medium. The master device includes a master controller. The slave device includes a slave controller and a hardware identifier designating a fixed slave device identification. The master controller executes a program code including an executable program code for determining a unique address, an executable program code for issuing a Get Identification command via transmission on the communications medium, an executable program code for receiving a slave device identification via transmission on the communications medium, and an executable program code for issuing a Set Address command via transmission on the communications medium. The Set Address command designates the unique address and the received slave device identification. The slave controller executes a program code including an executable program code for receiving the Get Identification command via transmission on the communications medium, and an executable program code responsive to receipt of the Get Identification command for transmitting the fixed slave device identification via transmission on the communications medium, detecting errors in transmission, and terminating transmission upon detecting an error. The slave controller further executes an executable program code for receiving the Set Address command via transmission on the communications medium. The Set Address command includes a received address and a received identification. The slave controller further executes a program code including an executable program code responsive to receipt of the Set Address command for comparing the received identification and the fixed slave device identification to determine a match condition of matching or nonmatching and an executable program code for assigning the received address to the slave device when the match condition is matching.

The described system and method achieves many advantages. It is advantageous that the system and method allows multiple devices to be easily and correctly connected to a single master control device. Unique addresses are correctly set for the multiple devices without manual selection of hardwired interconnects, dip switches, or jumpers. The illustrative system and method also avoid tedious and error prone manual setting of switches or manipulation of switches through software control, It is advantageous that hardware identification is designated on a per-agent basis so that a master device can associate context with a hardware (UID) identified agent rather than an address-identified agent. As agents are added or removed due to disconnection and reconnection to the bus, thereby allowing hot-plugging, context is reassociated with hardware (UID) identified agents rather than being discarded and recreated.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DESCRIPTION OF THE ILLUSTRATIVE EMBODIMENT(S)

Figure 1:
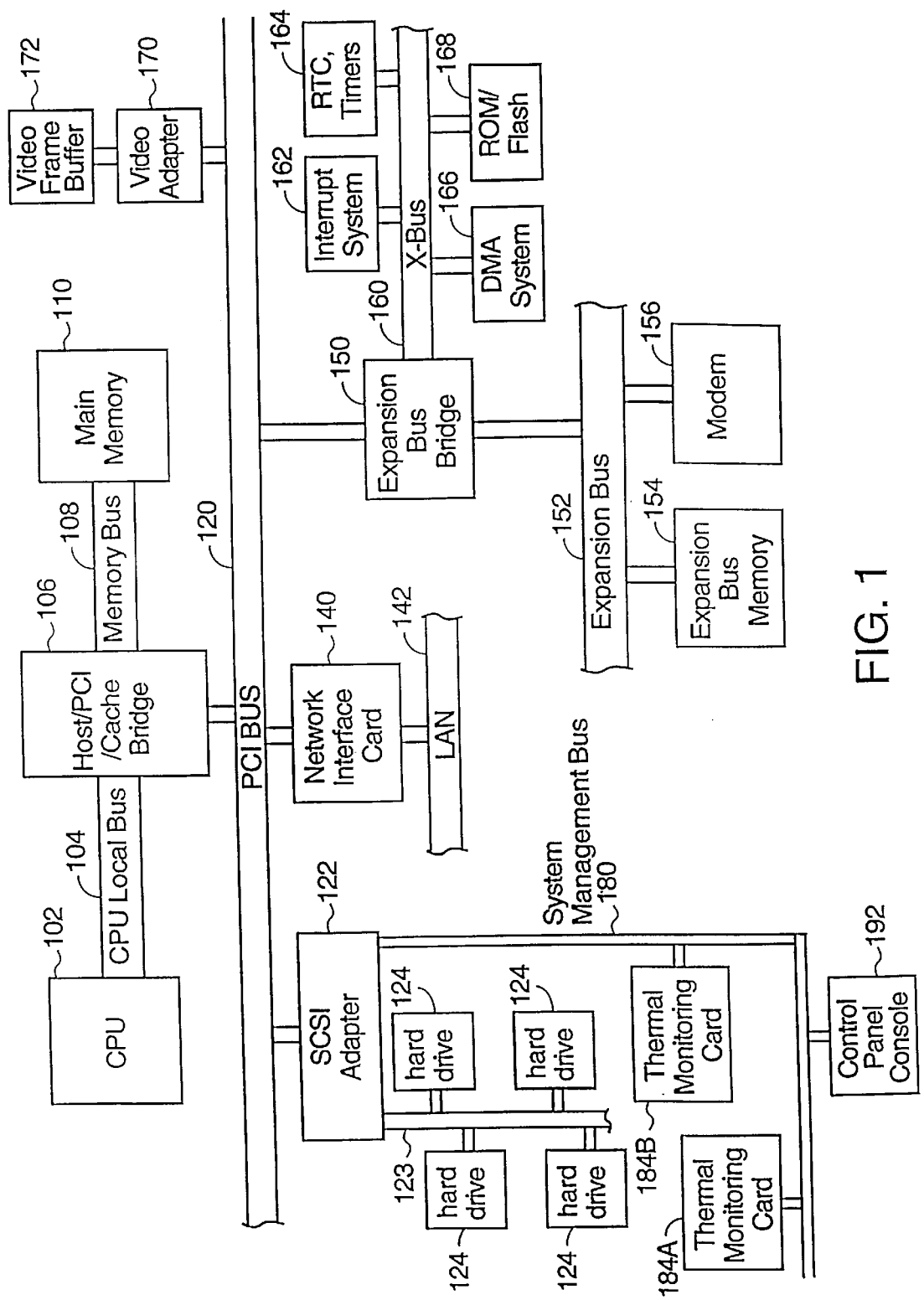
FIG. 1 is a schematic block diagram illustrating a computer system including a system management bus that is suitable for implementing an embodiment of the system and method of the present invention.

Referring to FIG. 1, a schematic block diagram illustrates a computer system which incorporates a plurality of buses or other communications media including a system management bus and is suitable for implementing a system and operating method for assigning unique addresses to agents on a bus. The system and method operate to assign unique addresses to devices connected to a bus such as a serial bus or, more specifically for some embodiments, a serial system management bus. The system and operating method for assigning unique addresses to agents on a bus may be used with various types of serial buses and may be incorporated into any of various types of computer systems. As shown, the computer system includes a processor 102 such as a central processing unit (CPU) which is connected through a processor local bus 104 to a host/PCI/cache bridge 106. The bridge 106 connects through a memory bus 108 to a main memory 110. The host/PCI/cache bridge 106 also interfaces to a peripheral component interconnect (PCI) bus 120. In the illustrative embodiment, a PCI local bus is used. However, it is noted that other local buses may be used, such as the VESA (Video Electronics Standards Association) VL bus.

Various types of devices are connected to the PCI bus 120. In the embodiment shown in FIG. 1, a video adapter 170 and video frame buffer 172 are connected to the PCI bus 120 for controlling video functions. A SCSI (small computer systems interface) adapter 122 is connected to the PCI bus 120. In the illustrative embodiment, the SCSI adapter 122 includes firmware which enables the adapter 122 to operate as an SMB master as discussed hereinafter. The SCSI adapter 122 includes a SCSI channel 123 which may have various connected devices. In the embodiment shown in FIG. 1, the SCSI channel 123 includes four disk drive units 124. It is noted that other devices may be connected to the SCSI channel 123, as desired. Various other devices may be connected to the PCI bus 120, such as a network interface card 140. As shown, the network interface card 140 interfaces to a local area network (LAN) 142.

Expansion bus bridge logic 150 is also connected to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be connected to the expansion bus 152, including expansion bus memory 154 and a modem 156. The expansion bus bridge logic 150 also connects to a peripheral expansion bus referred to as an X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are connected to the X-bus 160. Other peripherals (not shown) are connected to the X-bus 160, including communications ports, diagnostics ports, command/status registers, non-volatile static random access memory (NVSRAM), etc.

The computer system shown in FIG. 1 includes a system management bus 180 as shown. As discussed in the background section, the system management bus 180 provides connectivity between various monitoring devices in a system. The various monitoring devices connected to the bus 180 operate without involvement of the host processor 102 and operate independently of the operating system.

In the embodiment shown in FIG. 1, the SMB bus includes a plurality of slaves or agents, including two or more thermal monitoring cards (TMCs) 184A and 184B and one or more control panel consoles 192. Thermal monitoring cards (TMCs) are depicted for exemplary purposes only. In other embodiments, other types of SMB agents may be employed that are not used for thermal monitoring. The TMCs 184A and 184B each measure the temperature and voltages of crucial components within the system. For example, in one embodiment the TMCs 184A and 184B are each physically situated near a grouping of one or more hard drives, and each TMC 184A and 184B monitors temperatures and voltage fluctuations of the respective grouping of hard drives, the associated fan and power supply, and the TMC itself. If the temperature and/or certain measured voltages of one or more drives are not within predefined tolerances, the respective thermal monitoring card sounds an alarm, which may include turning on LEDs within the respective control panel console 192 or sounding a speaker. Therefore, each thermal monitoring card (TMC) 184A and 184B performs thermal and voltage monitoring operations on a grouping of disk drives in the computer system. For more information on the thermal monitoring cards, please see the Dell PowerEdge SP 590-2 System User's Guide, Appendix C, available from Dell Computer Corporation, Austin Tex., which is hereby incorporated by reference. Please also see the Dell PowerEdge XE 590-2 System Service Manual, available from Dell, which is hereby incorporated by reference.

The control panel console 192 monitors the status of the hard drives and includes a plurality of LEDs for indicating the status. For example, a respective LED may be red to indicate the disk drive is not operational, orange to indicate that the hard drive is inactive, and green to indicate that the hard drive is currently being accessed. It is noted that other types of SMB slaves may be comprised within the system which perform other functions, as desired. In the illustrative embodiment, each SMB slave includes a Phillips PCB83C552 Microprocessor.

Figure 2:
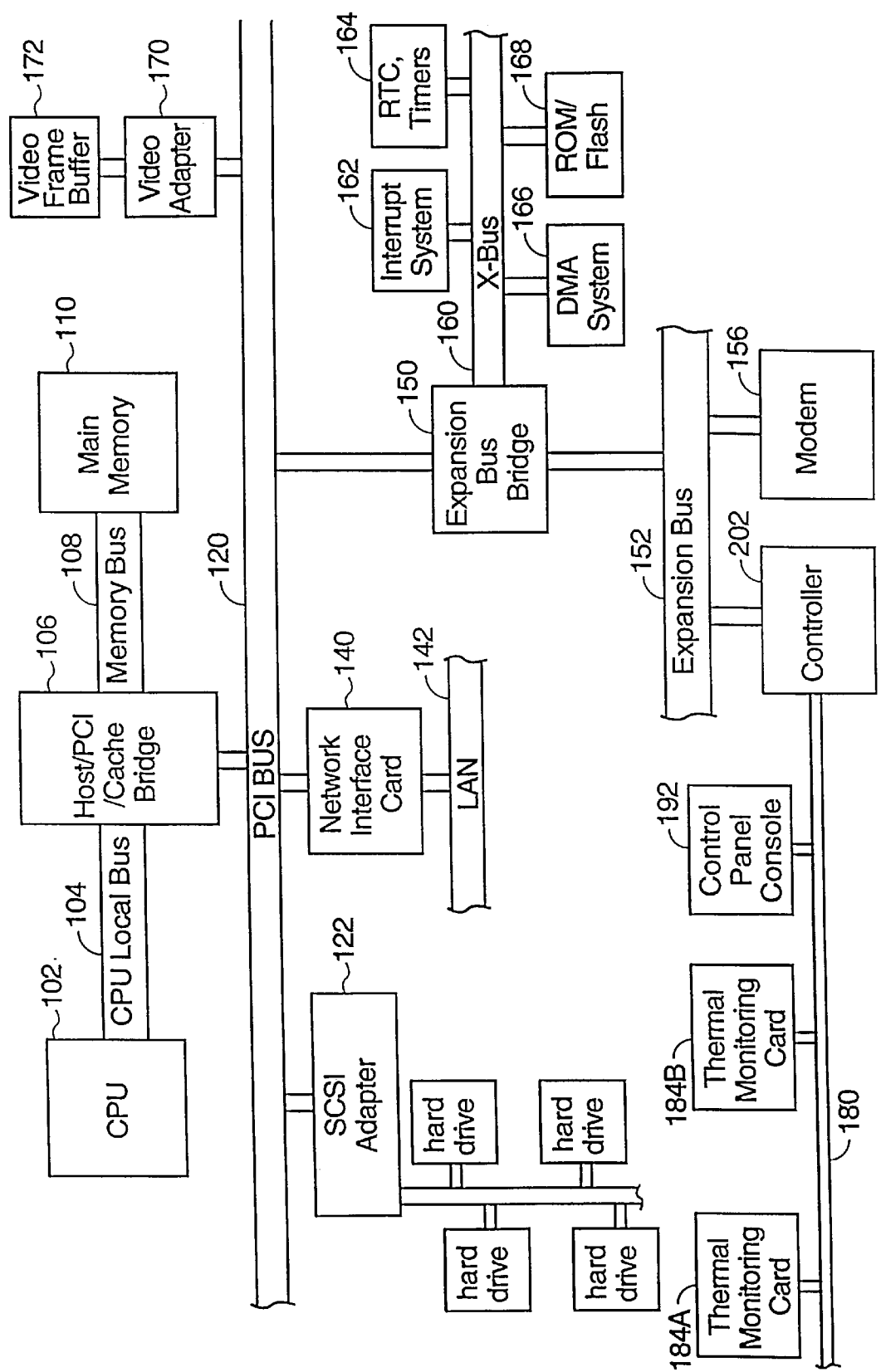
FIG. 2 is a schematic block diagram illustrating an alternate embodiment of the computer system of FIG. 1 and including a dedicated SMB master which is connected to an expansion bus of the computer system.

In the illustrative embodiment, the SCSI adapter 122 includes firmware which enables the adapter 122 to operate as a system management bus (SMB) master. As shown in FIG. 2, in an alternate and equally illustrative embodiment, the SMB master is configured as a separate dedicated microcontroller 202 connected to the expansion bus 152. It is noted that various other configurations may be used, as desired.

Figure 3:
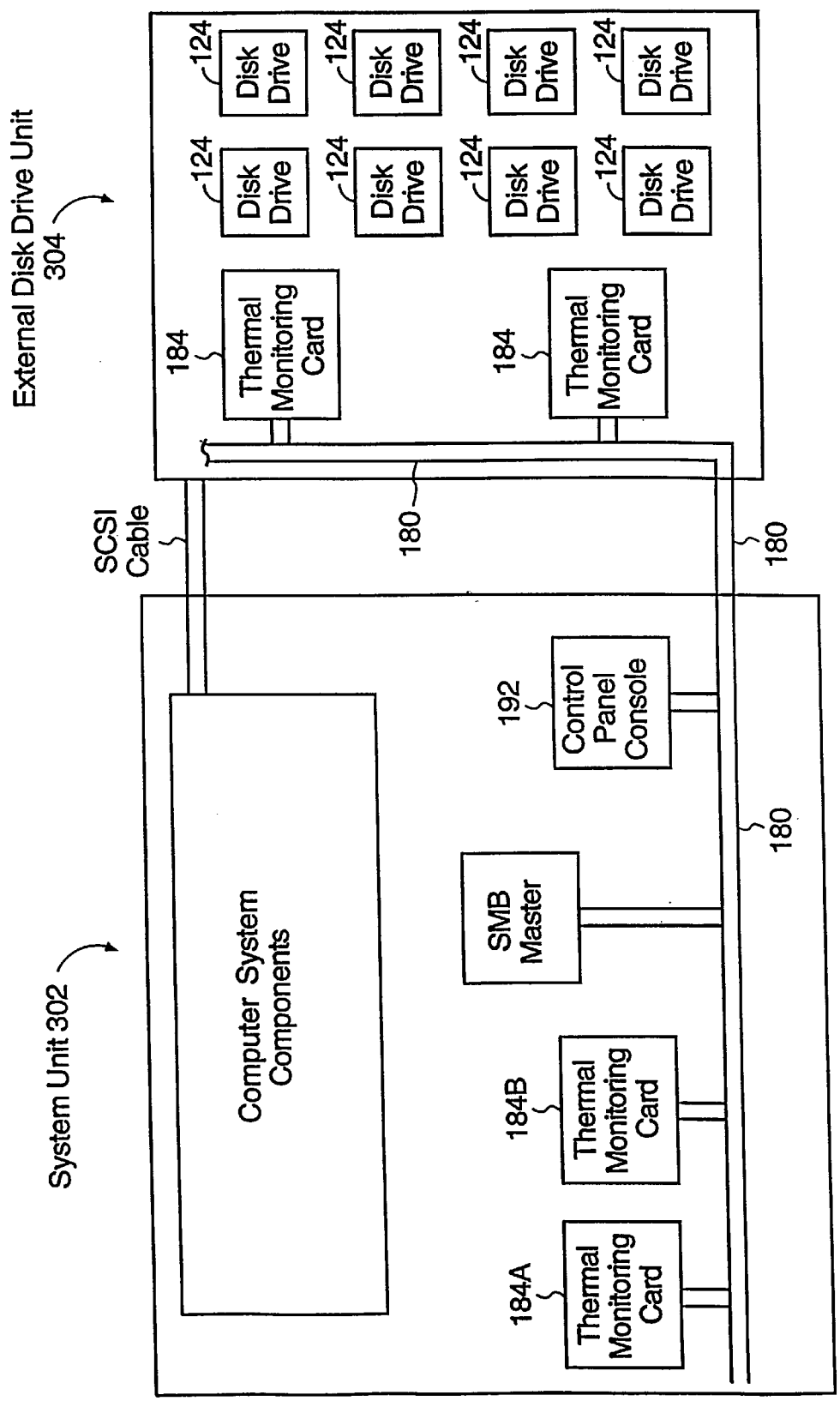
FIG. 3 is a schematic block diagram illustrating a computer system including a system management bus, a system unit, and an external disk drive unit.

Referring now to FIG. 3, in one embodiment the computer system includes a system unit 302 and a separate external disk drive storage unit 304 for storing additional disk drives. In this embodiment, the system management bus 180 connects between the system unit 302 and the external disk drive unit 304, and one or more monitoring devices comprised in the system unit 302 and the external disk drive unit 304 connected to the system management bus 180. As shown, the system unit 302 of the computer system includes a plurality of devices connected to the system management bus 180, including two thermal monitoring cards 184A and 184B, a control panel console 192, and an SMB master. The computer system unit 302 also includes the various computer system components shown in FIG. 1, although these elements are not shown in FIG. 3 for simplicity. The external disk drive unit 304 includes a plurality of hard drives 124 and one or more monitoring devices connected to the system management bus 180, such as one or more thermal monitoring cards 184A and 184B as shown.

In the illustrative embodiment, the system management bus 180 is implemented using the Phillips I²C serial bus. More specifically, in the illustrative embodiment the system management bus is implemented at the electrical level and the lowest protocol level using the I²C serial bus protocol. An additional protocol is used "on top" of the I²C bus which defines various bus commands to facilitate data transfers between the devices.

The I²C bus comprises three lines including a serial data line (not shown), a clock line (not shown), and a ground wire (not shown). Each agent connected to the I²C bus includes an open collector or dot-or connection to the data line. Thus, if an agent desires to transmit a logical zero on the data line, the agent pulls the line low. An agent transmits a logical high value on the line by simply floating the line high, i.e., not driving the line. For more information on the Phillips I²C serial bus please see the Signetics I²C Peripherals for Microcontrollers Handbook, published January 1992 which is hereby incorporated by reference in its entirety.

As mentioned above, the SMB bus can include a plurality of devices or agents connected to the bus. Each SMB agent is a processor, controller, microcontroller or the like that can operate either in a master or slave mode and can also operate as either a transmitter or receiver. The difference between an SMB master and an SMB slave is that the master initiates transactions on the bus. For example, the master arbitrates and gains ownership of the bus and then initiates a transfer. Therefore, the master initiates operations first, performs arbitration to gain control of the bus and then performs a transmission which includes addressing a slave. For example, the master can gain control of the bus, address a slave, and then may either transfer data to the slave or direct the slave to transmit information to the master. Thus, the master may reverse transmission directions in cooperation with the addressed slave and thus may either send data to a slave or receive data from a slave. Therefore, each I²C bus agent is either a master or a slave and also is orthogonally either in transmitter mode or receiver mode.

The I²C serial bus protocol provides for arbitration between multiple masters attempting to simultaneously access the bus. Arbitration is performed by each master by examining the data actually transmitted on the bus and comparing the transmitted data to the data that the respective master is attempting to transmit. The I²C data line is a dot-or serial bus where bits from each byte are transmitted serially on the bus. According to the I²C specification, master transmitter hardware examines each bit actually appearing on the bus and compares it with each bit the master is attempting to transmit on a bit-by-bit basis. A master transmitter ceases transmission if a mismatch occurs. The master transmitter that is not "in error," i.e., the remaining master transmitter which has not detected an error, is able to continue its transmission. Thus, arbitration between multiple SMB masters is performed "on the fly" during transmission. No agent except the one or more master transmitters in error knows that there has been any problem, and the one or more master transmitters in error are free to try their transmissions again at a later time.

The I²C serial bus protocol definition does not specify a particular comparison logic for SMB slaves. Therefore, components operating in slave mode are generally not configured with this bit comparison logic.

Agents connected to the I²C bus are addressed using a unique seven-bit code or address. In computer systems which utilize a system management bus, the computer system may include two or more SMB slaves, as shown in either of FIGS. 1, 2 or 3. Each SMB slave is specified to have its own SMB/I²C address. A designer hardwires a logical address or the unique address is provided by the user manually operating DIP switches or jumpers or using configuration software to operate logical switches. This specification to manually or programmatically set addresses of SMB agents can be both tedious and error prone. Therefore, the disclosed system and operating method assign unique addresses to SMB agents without user involvement.

Figure 4:
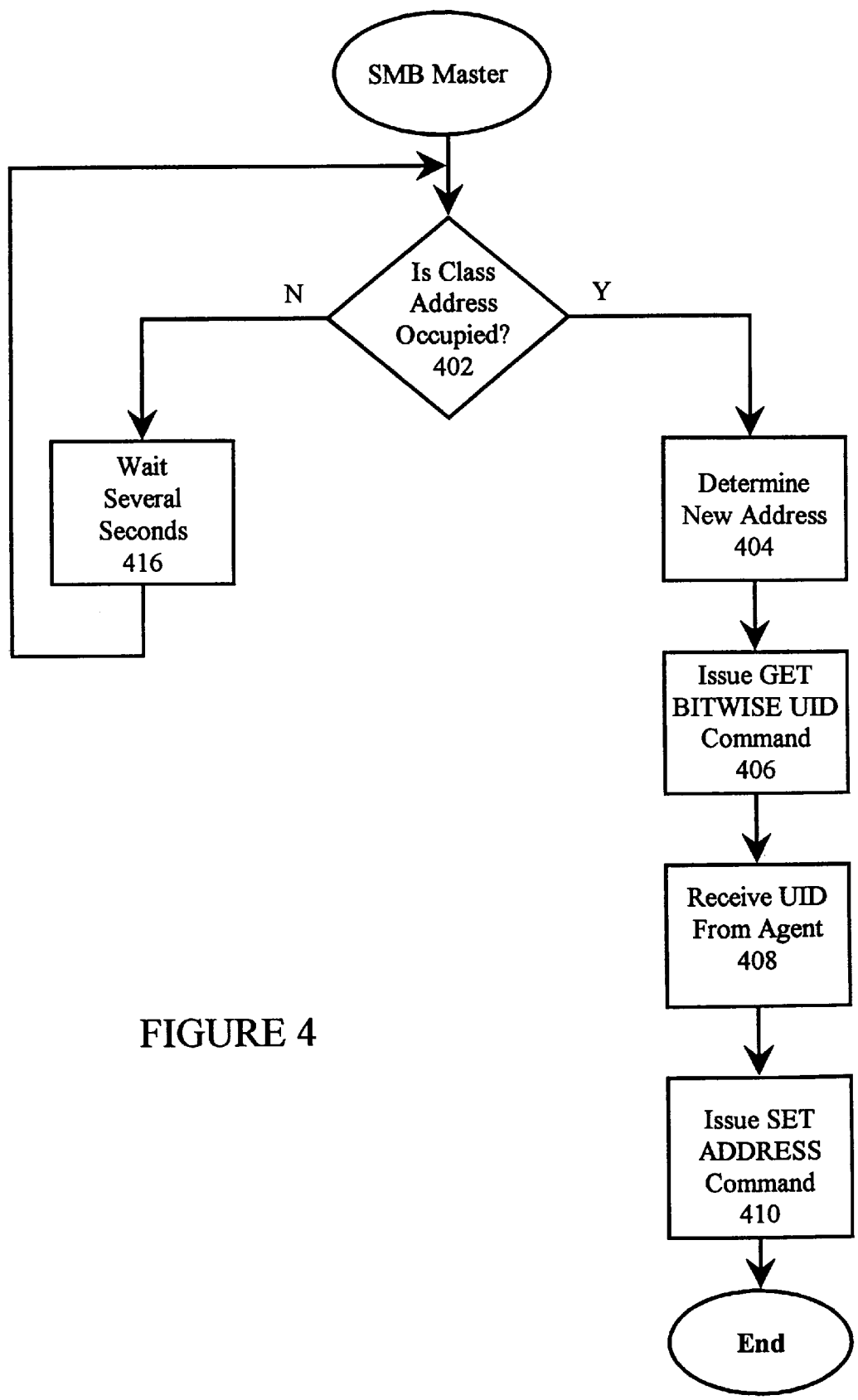
FIG. 4 is a flowchart diagram illustrating operation of the SMB master which issues Get Bitwise UID and Set Address commands for assigning unique addresses to SMB agents according to an embodiment of the present invention.

Referring to FIG. 4, a flowchart diagram illustrates operation of a System Management Bus (SMB) master automatically assigning addresses to various system management (SMB) slaves in a computer system. In operation 402 the SMB master first determines if any of the SMB slaves reside at an address referred to as the class address. The class address is a default address of all agents of a particular type. At initialization, all of the SMB slaves are initially configured to operate at class addresses specified for defined agent classes. For example, all TMCs are initially configured to respond at a first or "TMC" class address, all control panel consoles are initially configured to respond to a second or "control panel" class address, and the like.

If one or more of the SMB slaves reside at the class address in operation 402, then in operation 404 the SMB master determines a new unique address for the SMB slaves. In operation 406 the SMB master issues a Get Bitwise UID command to SMB slaves that reside at the class address. The SMB master issues a Get Bitwise UID command to evoke a responsive transmission from SMB agents residing on the SMB at the class address. The operation of the SMB slaves in response to a Get Bitwise UID command is discussed further in the description of FIG. 5 hereinafter. In operation 408 the SMB master receives a hardware identification (UID) transmitted by one of the SMB slaves, the SMB slave that successfully transmits the UID in response to the Get Bitwise UID command. In an operation 410, the SMB master issues a Set Address command to the SMB slaves. The SMB master issues the Set Address command in combination with the unique agent address and the hardware identifier (UID) to all SMB slaves. Only the SMB slave having a hardware identifier (UID) that matches the hardware identifier included in the Set Address command processes the Set Address command to completion. At completion of the Set Address process, the SMB address of the slave is modified to the assigned unique address. The operations performed by the SMB agents or slaves in response to the Set Address command is discussed further hereinafter in the discussion of FIG. 6. One SMB slave always responds to the Set Address command issued in operation 410 so that transmission errors by SMB slaves that do not respond to the Set Address command are ignored.

In operation 402 if none of the SMB slaves are determined to reside at the class address, then each of the SMB slaves has received a unique address different from the beginning class address. In this case, in operation 416 the SMB master waits a period of seconds and during this time other operations are performed on the system management bus. After a certain period of time has elapsed, for example two or three seconds, the SMB master returns to operation 402 and repeats the process. Thus, the SMB master periodically performs the illustrative method.

If a new SMB slave is added to the SMB bus, then within a short period the SMB master performs the above steps and automatically assigns a new unique address to the SMB slave added. Since the SMB master periodically performs the automatic configuration to assign unique addresses to the SMB slaves, a new SMB slave is "hot pluggable" into the SMB bus. A new SMB slave subsequently added to the SMB bus receives a unique address without user intervention.

Figure 5:
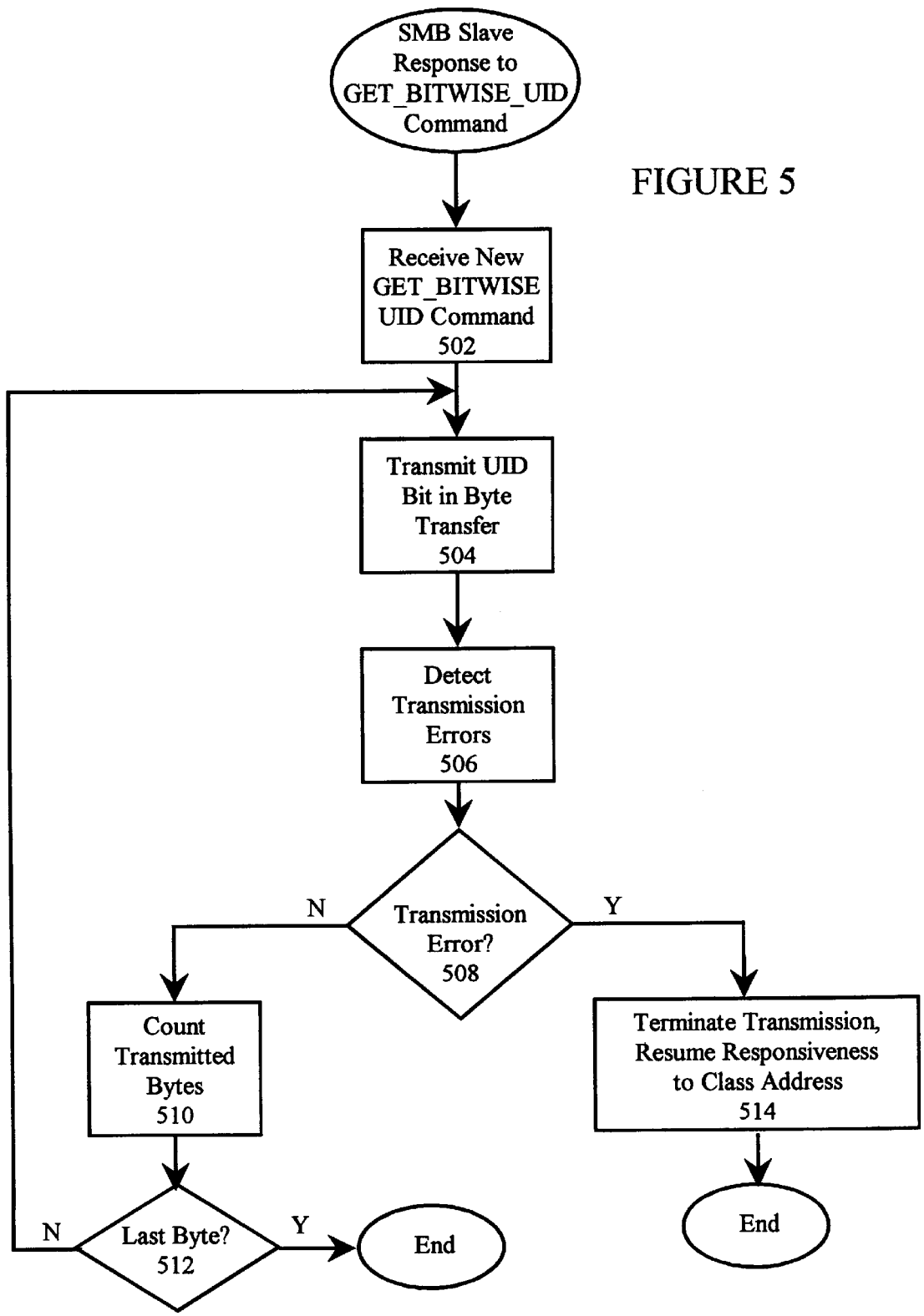
FIG. 5 is a flowchart diagram illustrating the response of an SMB agent to a Get Bitwise UID command.

Referring to FIG. 5, a flowchart diagram illustrates the operation of an SMB slave responding to a Get Bitwise UID command. In operation 502 the SMB slave receives the Get Bitwise UID command. In response to a Get Bitwise UID command, the SMB slave transmits a hardware identification uniquely associated with the SMB slave device. The agent devices connected to the system management bus 180, such as the two thermal monitoring cards 184A and 184B, the control panel console 192, and the SMB master include an identification hardware. One suitable identification hardware is a Dallas Semiconductor model DS2401 enhanced Silicon Serial Number identification hardware manufactured by Dallas Semiconductor of Dallas, Tex., that supplies a 64-bit unique hardware identification for an SMB agent. Accordingly, each SMB agent or slave has a 64-bit unique identification. An advantage of having the hardware identification designated on a per-agent basis is that a master device can associate context with a hardware (UID) identified agent rather than an address-identified agent. As agents are added or removed due to disconnection and reconnection to the bus, thereby allowing hot-plugging, context is reassociated with hardware (UID) identified agents rather than being discarded and recreated.

In operation 504, the SMB slave transmits a single bit of the 64-bit hardware identification (UID). The SMB agent transmits the hardware identifier (UID) one bit at a time with each bit transmitted as a single byte. The individual bits are formatted into bytes for transmission because SMB slaves or agents normally detect transmission errors due to multiple slaves simultaneously transmitting on byte boundaries. Since only a bit of information is transmitted in each transmitted byte, slaves effectively detect transmission errors on a bit boundary. In an illustrative embodiment, the responsive byte is transmitted as either all one's (0xff) or all zero's (0x00). The SMB agent transmits the hardware identification (UID) to the SMB master one bit per byte at a time. In the illustrative embodiment, the SMB agent transmits 64 bytes to the SMB master. By convention, the SMB data is "little endian" so that 64 bytes, representing 64 bits, are transmitted least significant bit first.

After transmission of a byte representing a single bit of the 64-bit hardware identification (UID) in operation 504, the SMB slave detects transmission errors during transmission of the byte in operation 506. The SMB slave samples the data bus when the slave transmits data but does not automatically respond if a miscompare occurs. The SMB slave makes available the entire byte of actually transmitted data and a program executing on the processor compares the actual transmitted byte to the byte intended for transmission to determine whether a transmission error has occurred. If an error is not detected according to decision operation 508, then in operation 510 the SMB slave updates a count of the number of transmitted bytes and determines whether the transmitted byte is the last byte of the identification bytes. In the illustrative embodiment, the last byte is the 64th transmitted byte. If the last byte is transmitted as determined by decision operation 512, the response to the Get Bitwise UID operation completes successfully. If the transmitted byte is not the last byte in the transfer of the slave identification bytes, the decision operation 512 directs that the SMB slave returns to operation 504 and transmits the next hardware identification (UID) byte. The SMB slave repeats operations 504, 506, 508, 510, and 512 until all hardware identification (UID) bytes are transmitted.

If the SMB slave detects an error after the transmission of a byte in operation 504 then, directed by the decision operation 508, in operation 514 the SMB slave ceases responding to a unique address, if a unique address was previously assigned and operative, and reverts to responsiveness to the class address.

In summary, the SMB slave agents respond to a Get Bitwise UID command by checking for transmission errors during the responsive transmission, terminating the responsive transmission upon detection of an error, and reverting to the class address if a unique address was previously assigned. Each of the slaves receives the Get Bitwise UID and responsively transmits the hardware identification (UID) associated to the slave in a loop of bitwise byte transmissions. One slave successfully transmits the hardware identification (UID) while all other individual slaves detect transmission errors during transmission of the hardware identification (UID) and terminate transmission upon the error detection. The unsuccessful slaves, if previously residing at a unique address, revert to the class address.

Figure 6:
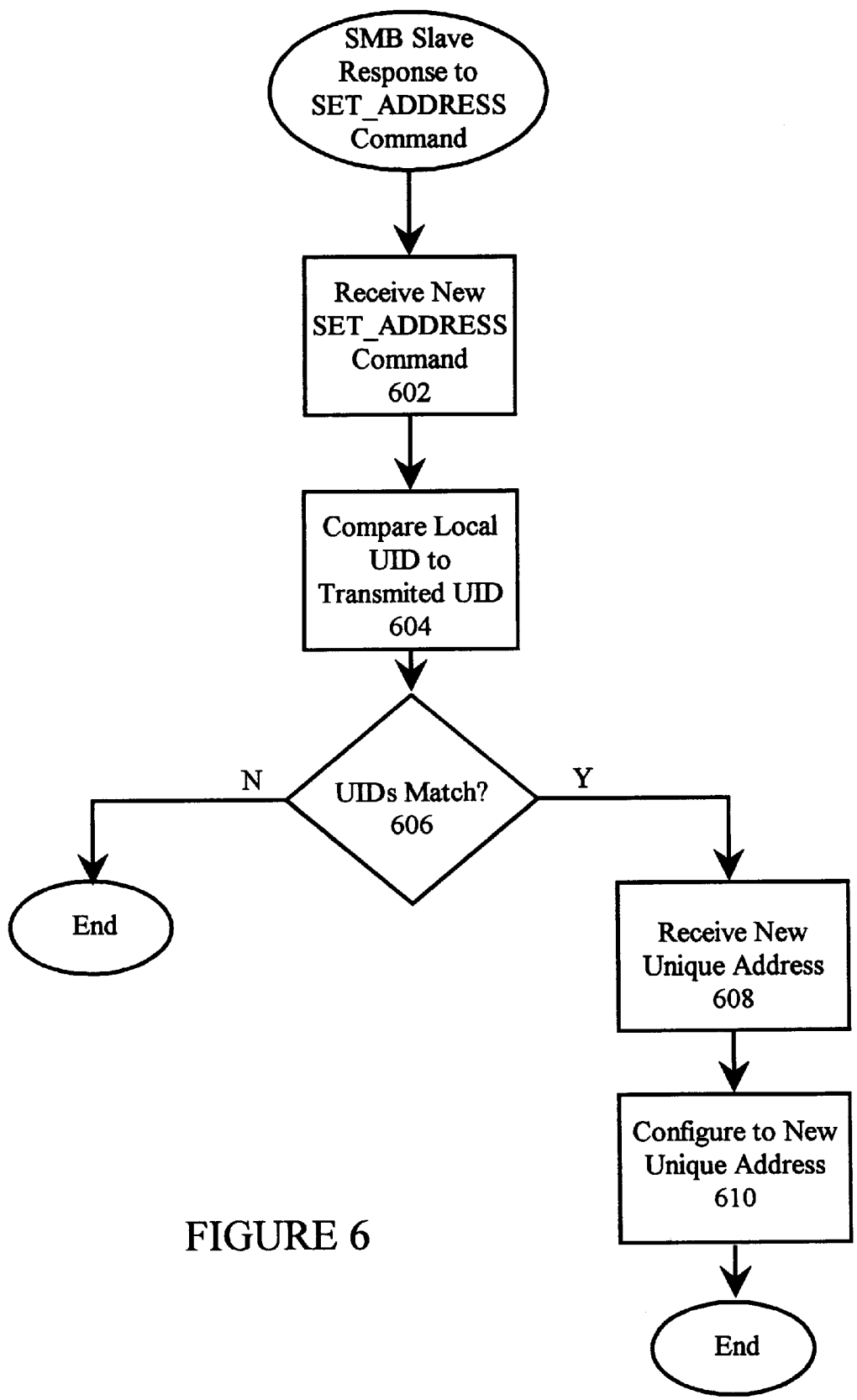
FIG. 6 is a flowchart diagram illustrating the response of an SMB agent to a Set Address command.

Referring to FIG. 6, a flowchart diagram illustrates the response of an SMB agent to a Set Address command of a SMB master. In operation 602 the SMB slave receives the Set Address command. The Set Address command is issued by the SMB master in combination with arguments including the unique agent address and the hardware identification (UID) to all SMB slaves. In operation 604 the SMB slave compares the received hardware identification (UID) transmitted via the Set Address command to the hardware identification (UID) associated, generally by hardcoding, with the SMB slave. If the received and associated hardware identifications (UIDs) match, as determined by the decision operation 606, the SMB agent receives the new unique address from the SMB master in an operation 608 and the SMB slave configures to the new unique address in operation 610, completing the operation of assigning the unique address. If the encoded hardware identification (UID) of the SMB slave does not match the transmitted hardware identification, as determined by the decision operation 606, then the SMB slave response to the Set Address command terminates without setting the agent address.

In summary, the SMB master sends the Set Address command to all SMB agents at a predetermined class address, the Set Address command including the hardware identification (UID) argument and the new unique address argument. All SMB agents at the class address receive the Set Address command, but only the single SMB agent with a hardware identification (UID) matching the transmitted identification changes assigned address to the new unique address.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. An apparatus comprising:

a communications medium;

a master device coupled to the communications medium, the master device including a master controller;

a slave device coupled to the communications medium, the slave device including a slave controller and a hardware identifier designating a fixed slave device identification;

a program code executable by the master controller including:

an executable program code for determining a unique address;

an executable program code for issuing a Get Identification command via transmission on the communications medium;

an executable program code for receiving a slave device identification via transmission on the communications medium; and an executable program code for issuing a Set Address command via transmission on the communications medium, the Set Address command designating the unique address and the received slave device identification; and a program code executable by the slave controller of the slave device including:

an executable program code for receiving the Get Identification command via transmission on the communications medium;

an executable program code responsive to receipt of the Get Identification command for transmitting the fixed slave device identification via transmission on the communications medium, detecting errors in transmission of individual bytes of the fixed slave device identification, sampling and comparing the individual transmitted bytes with bytes intended for transmission to detect transmission errors, updating a count of the number of transmitted bytes if no transmission error is detected, determining whether a last byte of the fixed slave identification bytes has been transmitted, terminating transmission upon detecting an error, and reverting to a class address and ceasing to respond to the unique address if a unique address was previously assigned;

an executable program code for receiving the Set Address command via transmission on the communications medium, the Set Address command including a received address and a received identification;

an executable program code responsive to receipt of the Set Address command for comparing the received identification and the fixed slave device identification to determine a match condition of matching or nonmatching; and an executable program code for assigning the received address to the slave device when the match condition is matching.

2. An apparatus according to claim 1, wherein the program code executable by the slave controller of the slave device further includes:

an executable program code for reverting to an assignment of a class address to the slave device when the match condition is nonmatching.

3. An apparatus according to claim 1, further comprising:

a plurality of slave devices coupled to the communications medium, individual slave devices of the plurality of slave device including a slave controller and a hardware identifier designating a fixed slave device identification.

4. An apparatus according to claim 1, further comprising:

a plurality of slave devices coupled to the communications medium, individual slave devices of the plurality of slave devices including a slave controller and a hardware identifier designating a fixed slave device identification, wherein:

the fixed slave device identification is a multiple-bit identification; and the executable program code executable by the individual slave devices and responsive to receipt of the Get Identification command for transmitting the fixed slave device identification via transmission on the communications medium, detecting errors in transmission, and terminating transmission upon detecting an error further includes:

an executable program code for transmitting the fixed slave device identification in a plurality of one-byte transmissions, one byte corresponding to one bit of the multiple-bit fixed slave device identification;

an executable program code for detecting transmission errors on a byte boundary corresponding to a bit boundary of the multiple-bit fixed slave device identification.

5. An apparatus according to claim 4, wherein:

the executable program code executable by the individual slave devices and responsive to receipt of the Get Identification command for transmitting the fixed slave device identification via transmission on the communications medium, detecting errors in transmission, and terminating transmission upon detecting an error further includes:

an executable program code for transmitting the fixed slave device identification in a plurality of one-byte transmissions, one byte corresponding to one bit of the multiple-bit fixed slave device identification;

an executable program code for comparing data on the communications and the most recent of the one byte transmissions and determining a matching condition or a nonmatching condition, and an executable program code for terminating transmission when the nonmatching condition is determined.

6. An apparatus according to claim 1, further comprising:

a plurality of slave devices coupled to the communications medium, individual slave devices of the plurality of slave devices including a slave controller and a hardware identifier designating a fixed slave device identification, wherein the program code executable by the master controller further includes:

an executable program code for looping a plurality of iterations and setting unique addresses for the plurality of slave devices.

7. An apparatus according to claim 1, further comprising:

a plurality of slave devices of a single class coupled to the communications medium, individual slave devices of the plurality of slave devices including a slave controller and a hardware identifier designating a fixed slave device identification, wherein the program code executable by the master controller further includes:

an executable program code for looping a plurality of iterations and setting unique addresses for the plurality of slave devices in the single class.

8. An apparatus according to claim 1, further comprising:

a plurality of N slave devices in a single class coupled to the communications medium, individual slave devices of the plurality of slave devices including a slave controller and a hardware identifier designating a fixed slave device identification, wherein the program code executable by the master controller further includes:

an executable program code for looping a N iterations and setting unique addresses for the N slave devices in the single class.

9. An apparatus according to claim 1, further wherein:

the hardware identifier is an SMB agent identifier.

10. A computer program product comprising:

a computer usable medium having computable readable code embodied therein including the program code executable by the master controller and the program code executable by the slave controller according to claim 1.

11. A master device for controlling a plurality of slave devices, the master device and the plurality of slave devices being coupled by a communications medium, the master device comprising:

a master controller; and a program code executable by the master controller including:

an executable program code for determining a unique address;

an executable program code for issuing a Get Identification command to the plurality of slave devices via transmission on the communications medium;

an executable program code for receiving a slave device identification via transmission on the communications medium, the slave device identification being sent by a slave device that successfully transmits the slave device identification, the slave device detecting errors in transmission of individual bytes of a fixed slave device identification, sampling and comparing individual transmitted bytes with bytes intended for transmission to detect transmission errors, updating a count of the number of transmitted bytes if no transmission error is detected, determining whether a last byte of the fixed slave identification bytes has been transmitted, terminating transmission upon detecting an error, and reverting to a class address and ceasing to respond to the unique address if a unique address was previously assigned; and an executable program code for issuing a Set Address command via transmission on the communications medium, the Set Address command designating the unique address and the received slave device identification.

12. A master device according to claim 11, further comprising:

an executable program code for looping a plurality of iterations and setting unique addresses for the plurality of slave devices.

13. A master device according to claim 11, wherein the plurality of slave devices include a plurality of slave devices of a single class, the master device further comprising:

an executable program code for looping a plurality of iterations and setting unique addresses for the plurality of slave devices in the single class.

14. A master device according to claim 11, wherein the plurality of slave devices include a plurality of N slave devices in a single class, the master device further comprising:

an executable program code for looping a N iterations and setting unique addresses for the N slave devices in the single class.

15. A computer program product comprising:

a computer usable medium having computable readable code embodied therein including the program code executable by the master controller according to claim 11.

16. A slave device operable in connection with a computer system including a communications medium for connection to the slave device, and a master device connected to the communications medium, the slave device comprising:

a slave controller;

a hardware identifier coupled to the slave controller designating a fixed slave device identification; and a program code executable by the slave controller of the slave device including:

an executable program code for receiving a Get Identification command transmitted on the communications medium by the master device;

an executable program code responsive to receipt of the Get Identification command for transmitting the fixed slave device identification via transmission on the communications medium, detecting errors in transmission of individual bytes of the fixed slave device identification, sampling and comparing the individual transmitted bytes with bytes intended for transmission to detect transmission errors, updating a count of the number of transmitted bytes if no transmission error is detected, determining whether a last byte of the fixed slave identification bytes has been transmitted, terminating transmission upon detecting an error, and reverting to a class address and ceasing to respond to the unique address if a unique address was previously assigned;

an executable program code for receiving a Set Address command transmitted on the communications medium, the Set Address command including a received address and a received identification;

an executable program code responsive to receipt of the Set Address command for comparing the received identification and the fixed slave device identification to determine a match condition of matching or nonmatching; and an executable program code for assigning the received address to the slave device when the match condition is matching.

17. A slave device according to claim 16, wherein the program code executable by the slave controller of the slave device further includes:

an executable program code for reverting to an assignment of a class address to the slave device when the match condition is nonmatching.

18. A system operable in connection with a computer system including a communications medium for connection to the system, and a master device connected to the communications medium, the system comprising:

a slave controller;

a hardware identifier coupled to the slave controller designating a fixed slave device identification; and a program code executable by the slave controller of the slave device including:

an executable program code for receiving a Get Identification command transmitted on the communications medium by the master device;

an executable program code responsive to receipt of the Get Identification command for transmitting the fixed slave device identification via transmission on the communications medium, detecting errors in transmission of individual bytes of the fixed slave device identification, sampling and comparing the individual transmitted bytes with bytes intended for transmission to detect transmission errors, updating a count of the number of transmitted bytes if no transmission error is detected, determining whether a last byte of the fixed slave identification bytes has been transmitted, terminating transmission upon detecting an error, and reverting to a class address and ceasing to respond to the unique address if a unique address was previously assigned;

an executable program code for receiving a Set Address command transmitted on the communications medium, the Set Address command including a received address and a received identification;

an executable program code responsive to receipt of the Set Address command for comparing the received identification and the fixed slave device identification to determine a match condition of matching or nonmatching; and an executable program code for assigning the received address to the slave device when the match condition is matching.

19. A system according to claim 18, further comprising:
a plurality of slave devices coupled to the communications medium, individual slave devices of the plurality of slave devices including a slave controller and a hardware identifier designating a fixed slave device identification.

20. A system according to claim 18, further comprising:
a plurality of slave devices coupled to the communications medium, individual slave devices of the plurality of slave devices including a slave controller and a hardware identifier designating a fixed slave device identification, wherein:

the fixed slave device identification is a multiple-bit identification; and the executable program code executable by the individual slave devices and responsive to receipt of the Get Identification command for transmitting the fixed slave device identification via transmission on the communications medium, detecting errors in transmission, and terminating transmission upon detecting an error further includes:

an executable program code for transmitting the fixed slave device identification in a plurality of one-byte transmissions, one byte corresponding to one bit of the multiple-bit fixed slave device identification;

an executable program code for detecting transmission errors on a byte boundary corresponding to a bit boundary of the multiple-bit fixed slave device identification.

21. A system according to claim 20, wherein:
the executable program code executable by the individual slave devices and responsive to receipt of the Get Identification command for transmitting the fixed slave device identification via transmission on the communications medium, detecting errors in transmission, and terminating transmission upon detecting an error further includes:

an executable program code for transmitting the fixed slave device identification in a plurality of one-byte transmissions, one byte corresponding to one bit of the multiple-bit fixed slave device identification;

an executable program code for comparing data on the communications and the most recent of the one byte transmissions and determining a matching condition or a nonmatching condition, and an executable program code for terminating transmission when the nonmatching condition is determined.

22. A method of configuring a system including a plurality of devices connected to a communications medium, the devices including a master device and a slave device, the slave device including a hardware identifier designating a fixed slave device identification, the method comprising:

determining a unique address;

issuing a Get Identification command from the master device via transmission on the communications medium;

receiving the Get Identification command at the slave device via transmission on the communications medium;

on receipt of the Get Identification command at the slave device, transmitting from the slave device the fixed slave device identification via transmission on the communications medium, detecting errors in transmission of individual bytes of the fixed slave device identification, sampling and comparing the individual transmitted bytes with bytes intended for transmission to detect transmission errors, updating a count of the number of transmitted bytes if no transmission error is detected, determining whether a last byte of the fixed slave identification bytes has been transmitted, terminating transmission upon detecting an error, and reverting to a class address and ceasing to respond to the unique address if a unique address was previously assigned;

receiving a slave device identification at the master device via transmission on the communications medium; and issuing a Set Address command from the master device via transmission on the communications medium, the Set Address command designating the unique address and the received slave device identification; and receiving the Set Address command at the slave device via transmission on the communications medium, the Set Address command including a received address and a received identification;

on receipt of the Set Address command at the slave device, comparing the received identification and the fixed slave device identification to determine a match condition of matching or nonmatching; and assigning the received address to the slave device when the match condition is matching.

23. A method according to claim 22, further comprising:
reverting to an assignment of a class address to the slave device when the match condition is nonmatching.

24. A method according to claim 22, wherein the plurality of devices includes:
a plurality of slave devices coupled to the communications medium, individual slave devices of the plurality of slave device including a hardware identifier designating a fixed slave device identification.

25. A method according to claim 22, wherein:
the plurality of devices includes a plurality of slave devices coupled to the communications medium, individual slave devices of the plurality of slave devices including a hardware identifier designating a fixed slave device identification, the fixed slave device identification being a multiple-bit identification; and the operations of transmitting the fixed slave device identification via transmission on the communications medium, detecting errors in transmission, and terminating transmission upon detecting an error further includes:
transmitting from the slave device the fixed slave device identification in a plurality of one-byte transmissions, one byte corresponding to one bit of the multiple-bit fixed slave device identification;
detecting transmission errors on a byte boundary corresponding to a bit boundary of the multiple-bit fixed slave device identification.

26. A method according to claim 22, wherein:
the operations of transmitting the fixed slave device identification via transmission on the communications medium, detecting errors in transmission, and terminating transmission upon detecting an error further include:
transmitting from the slave device the fixed slave device identification in a plurality of one-byte transmissions, one byte corresponding to one bit of the multiple-bit fixed slave device identification;
comparing data on the communications and the most recent of the one byte transmissions and determining a matching condition or a nonmatching condition, and
terminating transmission when the nonmatching condition is determined.

27. A method according to claim 22, wherein the plurality of devices includes a plurality of slave devices coupled to the communications medium, individual slave devices of the plurality of slave devices including a hardware identifier designating a fixed slave device identification, the method further comprising:
looping a plurality of iterations and setting unique addresses for the plurality of slave devices.

28. A method according to claim 22, wherein the plurality of devices includes a plurality of slave devices of a single class coupled to the communications medium, individual slave devices of the plurality of slave device including a hardware identifier designating a fixed slave device identification, the method further comprising:
looping a plurality of iterations and setting unique addresses for the plurality of slave devices in the single class.

29. A method according to claim 22, wherein the plurality of devices includes a plurality of N slave devices in a single class coupled to the communications medium, individual slave devices of the plurality of slave device including a hardware identifier designating a fixed slave device identification, the method further comprising:
looping a N iterations and setting unique addresses for the N slave devices in the single class.

30. A method according to claim 22, wherein:
the hardware identifier is an SMB agent identifier.

31. A computer program product comprising:
a computer usable medium having computable readable code embodied therein including a program code for performing a method according to claim 22.

* * * * *